(12) United States Patent
Mohanaveeramani et al.

(10) Patent No.: US 11,424,679 B2
(45) Date of Patent: Aug. 23, 2022

(54) BUCK BOOST CONVERTER CELL FOR MMC

(71) Applicant: Hitachi Energy Switzerland AG, Baden (CH)

(72) Inventors: Aravind Mohanaveeramani, Västerås (SE); Jan Svensson, Västerås (SE); Lennart Harnefors, Västerås (SE); Alireza Nami, Västerås (SE)

(73) Assignee: HITACHI ENERGY SWITZERLAND AG, Baden (CH)

( * ) Notice: Subject to any disclaimer, the term of this patent is extended or adjusted under 35 U.S.C. 154(b) by 0 days.

(21) Appl. No.: 17/429,852

(22) PCT Filed: Feb. 27, 2019

(86) PCT No.: PCT/EP2019/054835
§ 371 (c)(1),
(2) Date: Aug. 10, 2021

(87) PCT Pub. No.: WO2020/173557
PCT Pub. Date: Sep. 3, 2020

(65) Prior Publication Data
US 2022/0045610 A1 Feb. 10, 2022

(51) Int. Cl.
 *H02M 3/158* (2006.01)
 *H02M 7/483* (2007.01)
 (Continued)

(52) U.S. Cl.
 CPC ......... *H02M 3/1582* (2013.01); *H02M 7/483* (2013.01); *H02J 3/1857* (2013.01); *H02J 3/36* (2013.01)

(58) Field of Classification Search
 CPC .................................................. H02M 3/1582
 See application file for complete search history.

(56) References Cited

U.S. PATENT DOCUMENTS 9,083,230 B2 * 7/2015 Narimani ............. H02M 7/483
9,130,458 B2 * 9/2015 Crookes ................ H02M 7/217
(Continued)

FOREIGN PATENT DOCUMENTS

| WO | 2012146463 A1 | 11/2012 |
| WO | 2016150466 A1 | 9/2016 |
| WO | 2017001024 A1 | 1/2017 |

OTHER PUBLICATIONS

Hofmann, Viktor, et al., "An Optimized Hybrid-MMC for HVDC", PCIM Europe 2016, Nuremberg, Germany, May 10-12, 2016, pp. 355-362.
(Continued)

*Primary Examiner* — Jared Fureman
*Assistant Examiner* — Esayas G Yeshaw
(74) *Attorney, Agent, or Firm* — Slater Matsil, LLP

(57) ABSTRACT

The present disclosure relates to a converter cell (4) for an MMC. The cell comprises a primary energy storage ($C_m$), an inductor (Lf), and a secondary energy storage ($C_f$); and first and second converter valves (T1, T2). The secondary energy storage ($C_f$) is connected in series with the first converter valve (T1), and together with said first converter valve in parallel with the inductor ($L_f$), and the primary energy storage ($C_m$) is connected in series with the second converter valve (T2), and together with said second converter valve (T2) in parallel with the inductor ($L_f$).

19 Claims, 2 Drawing Sheets

(51) Int. Cl.
  *H02J 3/18*  (2006.01)
  *H02J 3/36*  (2006.01)

(56)    References Cited

U.S. PATENT DOCUMENTS

| 9,240,731 B2* | 1/2016 | Wei ....................... H02M 5/458 |
| 9,287,764 B2* | 3/2016 | Furyk ................... H02M 1/088 |
| 9,325,252 B2* | 4/2016 | Narimani ............ H02M 7/4837 |
| 2014/0226377 A1 | 8/2014 | Goetz et al. |
| 2016/0064160 A1 | 3/2016 | Lemmen et al. |
| 2017/0163043 A1* | 6/2017 | Garces .................. H02M 7/483 |

OTHER PUBLICATIONS

Xu, Shuang, et al., "Single-Phase Differential Buck-Boost Inverter with Pulse Energy Modulation and Power Decoupling Control", IEEE Journal of Emerging and Selected Topics in Power Electronics, vol. 6, Apr. 27, 2018, pp. 2060-2072.

* cited by examiner

BUCK BOOST CONVERTER CELL FOR MMC

CROSS-REFERENCE TO RELATED APPLICATIONS

This application is a national stage application of International Application No. PCT/EP2019/054835, filed on Feb. 27, 2019, which application is hereby incorporated herein by reference.

TECHNICAL FIELD

The present disclosure relates to a converter cell for a Modular Multilevel Converter (MMC).

BACKGROUND

MMC:s have become a popular choice for Medium Voltage (MV) and High-Voltage (HV) grid connected converters due to its enhanced modularity, scalability and excellent harmonic performance with reduced losses. Developments toward footprint (size) reduction and compactness has been in focus lately.

To reduce the cell capacitance and/or possible integration of energy storage within cell, WO2016/150466A1 discloses a Half-Bridge (HB) configuration with a DC-DC stage connecting to a main energy storage, which can be a battery, super capacitor or a normal capacitor. A filtering inductor is also required to control the current/power flow between the main energy storage and a filter energy storage. Some of the switches are switched at near fundamental frequency to insert or bypass the cell, while the switches of the DC-DC stage are switched at higher frequencies (>1 kHz) to reduce the size of the filtering elements. Disadvantages with that cell include the requirement of two different types of switches i.e., ones that switches at near fundamental switching frequency and the DC-DC stage that switches at high switching frequency, and a complex control structure is required i.e., a sorting algorithm with a central control architecture to operate the switches with fundamental frequency and local cell-level controllers to operate the DC-DC stage switches.

SUMMARY

A conventional MMC is composed of HB or Full-Bridge (FB) cells, depending on application. Since each HB or FB cell is a so called buck converter, the cell DC voltage must always be higher than the generated output voltage else the diodes will be forward biased and the cell will behave as a diode rectifier. Of course, overmodulation may be allowed up to e.g. 1.27 p.u. but with harmonic injection. Only linear modulation is considered here for the sake of simplicity. For High-Voltage Direct Current (HVDC), Static Synchronous Compensator (STATCOM) and other MMC applications, such as Static Frequency, Railway Power Supply converter, etc., the net DC energy flowing into the cell energy storage per fundamental frequency cycle may be zero. However, there may exist a ripple energy (e.g. 50 or 100 Hz depending on the topology or operation) that needs to be stored in the cell energy storage. The cell capacitance may then be rated so that linear modulation is ensured for all operating points considering the ripple energy from the converter arm. The expression of the cell energy storage (here a capacitor) calculation may be:

$$C_{cell} = \frac{2E_{arm,pk-pk}}{N(U_{max}^2 - U_{min}^2)} \quad (1)$$

where,
$C_{cell}$ is the required cell capacitance,
$E_{arm,pk-pk}$ is the peak-to-peak arm ripple energy which is calculated from the converter arm current and voltage waveforms,
N is the number of converter cells per converter arm, and
$U_{max}$ and $U_{min}$ are the cell voltage values at the maximum and minimum ripple points obtained from the system design considering all operating points of the MMC.

Typically, a cell voltage ripple of 10% peak-to-peak is considered for a conventional MMC cell. Hence, 90% of the cell energy storage energy is unused making the cell unnecessarily bulky.

It has now been realized that, by embodiments of the present invention, much more of the energy storage capacity, i.e. the cell DC voltage, can be used to handle the DC voltage ripple, whereby the size (both physically (footprint) and by capacity) of the energy storage of each cell can be substantially reduced. For instance, if 90% of the cell capacitor energy is used, then cell capacitor reduction up to 80%

$$\left(\frac{1.05^2 - 0.1^2}{1.05^2 - 0.95^2} = 5 \cdot 7 \text{ times reduction}\right)$$

can be achieved.

To generate the required cell output-voltage waveform irrespective of the large voltage ripple on the cell energy storage, a so called Buck-Boost (BB) operation in the converter cell will be required, in accordance with the present invention.

According to an aspect of the present invention, there is provided a converter cell for an MMC. The cell comprises a primary energy storage, an inductor, and a secondary energy storage. The cell also comprises first and second converter valves, the first converter valve comprising a first semiconductor switch and a first antiparallel diode and the second converter valve comprising a second semiconductor switch, having the same polarity as the first semiconductor switch, and a second antiparallel diode. The secondary energy storage is connected in series with the first converter valve, and said secondary energy storage is together with said first converter valve connected in parallel with (across) the inductor. The primary energy storage is connected in series with the second converter valve, and said primary energy storage is together with said second converter valve connected in parallel with (across) the inductor.

The cell may be configured such that, when power is flowing into the cell and the first semiconductor switch is switched to conducting and the second semiconductor switch is switched to non-conducting, a current is allowed to flow from the secondary energy storage to the inductor, charging the inductor, via the first semiconductor switch. Then, when both the first semiconductor switch and the second semiconductor switch are switched to non-conducting, a current is allowed to flow from the charged inductor to the primary energy storage, charging the primary energy storage, via the second antiparallel diode.

Further, the cell may be configured such that, when power is flowing out of the cell and the first semiconductor switch is switched to non-conducting and the second semiconductor switch is switched to conducting, a current is allowed to flow from the primary energy storage to the inductor, charging the inductor, via the second semiconductor switch. Then, when both the first semiconductor switch and the second semiconductor switch are switched to non-conducting, a current is allowed to flow from the charged inductor to the secondary energy storage, charging the secondary energy storage, via the first antiparallel diode.

According to another aspect of the present invention, there is provided an MMC comprising a plurality of converter arms, each arm comprising a plurality of series-connected converter cells of the present disclosure.

According to another aspect of the present invention, there is provided a method performed by a control arrangement for controlling a converter cell in an MMC, e.g. a converter cell according to the aspect above.

The method typically comprises, when power is flowing into the cell, switching a first semiconductor switch to conducting while a second semiconductor switch is switched to non-conducting, allowing a current to flow within the cell from a secondary energy storage to an inductor, charging the inductor, via the first semiconductor switch, and switching the first semiconductor switch to non-conducting while the second semiconductor switch remains switched to non-conducting, allowing a current to flow within the cell from the charged inductor to a primary energy storage, charging the primary energy storage, via a second antiparallel diode which is antiparallel to the second semiconductor switch.

The method typically comprises, when power is flowing out of the cell, switching the second semiconductor switch to conducting while the first semiconductor switch is switched to non-conducting, allowing a current to flow within the cell from the primary energy storage to the inductor, charging the inductor, via the second semiconductor switch, and switching the second semiconductor switch to non-conducting while the first semiconductor switch remains switched to non-conducting, allowing a current to flow within the cell from the charged inductor to the secondary energy storage, charging the secondary energy storage, via a first antiparallel diode which is antiparallel to the first semiconductor switch.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
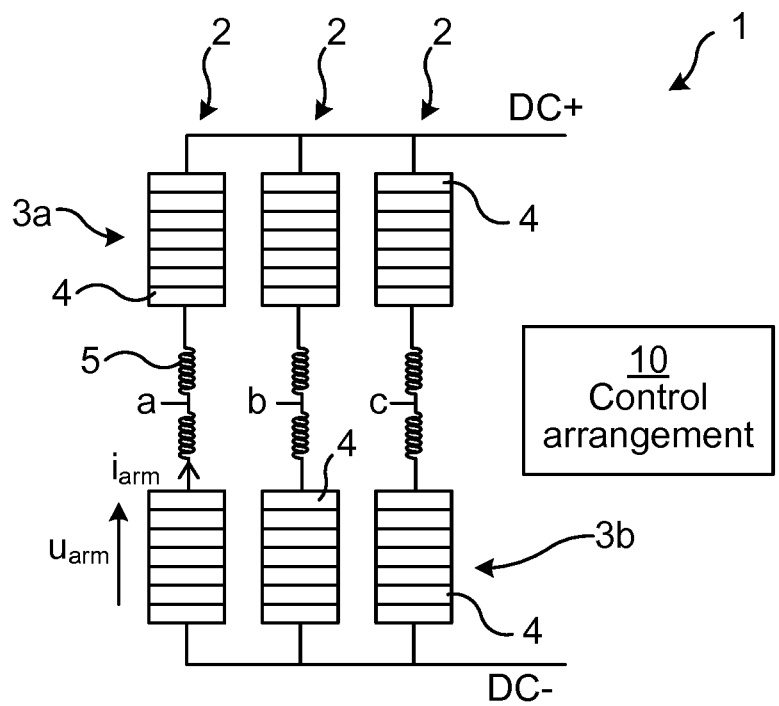
FIG. 1 is a schematic circuit diagram of an MMC, in accordance with embodiments of the present invention.
Figure 2:
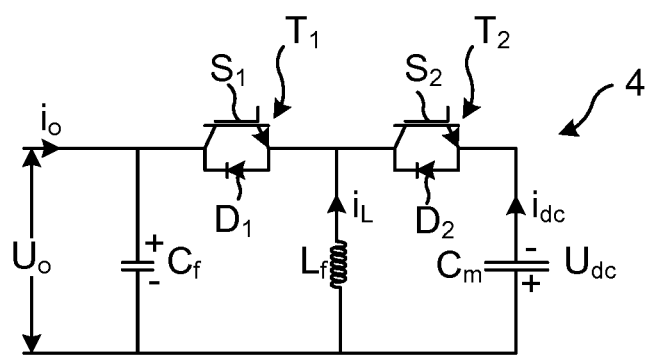
FIG. 2 is a schematic circuit diagram of a BB converter cell, in accordance with embodiments of the present disclosure.

The conception of a BB-MMC power electronic converter 1 is presented in FIGS. 1 and 2.

The present disclosure proposes an MMC 1 based on Buck-Boost (BB) cells 4. A reduction in cell capacitance of e.g. up to 80% may be achieved with the proposed BB-MMC compared with a conventional HB-MMC, with the price of doubling the semiconductor rating. Since the energy per cell 4 is reduced significantly (more than five times), the cell shoot-through failure and bypass protection requirements may be relaxed. This may allow use of semiconductor switches S with lower energy handling capabilities, e.g. bond-wire devices, to be used in MV and HV grid-connected MMC applications, which may result in a cost reduction. The proposed cell becomes more compact since the switching frequency of the BB cell 4 is increased. This may be a good fit for silicon carbide (SiC) semiconductor devices (switches S and/or diodes D). Each BB cell 4 may generate the requested voltage reference with only switching frequency harmonic components, in contrast to conventional HB cells where lower order harmonic components are also present. Hence, even with fewer number of cells per converter arm 3, the lower-order harmonic generation of the converter 1 may be avoided, making it suitable for Medium-Voltage Direct Current (MVDC), STATCOM or Railway Power Supply (intertie) applications where the number of cells 4 per arm 3 may be e.g. less than 10.

Since a distributed control architecture may be used for the BB-MMC 1 (i.e., the voltage reference is sent to each BB cell 4 and triangle carrier comparison PWM is done at the cell level), the need for a central controller for performing sorting algorithm as in a conventional chain-link converter may be eliminated, reducing the control delays and harmonic stability problems. Additionally, it may be noted that the proposed BB cell 4 can act as a current-source cell. Hence, no arm reactor 5 may be needed, or its rating can be reduced since each cell 4 has a reactor $L_f$ to control the current at a cell level resulting in a reduced footprint.

FIG. 1 illustrates an MMC 1, here in the form of a three-phase Alternating Current (AC) to Direct Current (DC) chain-link converter in double-star topology. It is noted that HVDC or MVDC may be preferred applications for some embodiments of the present invention, but also other applications may be preferred for some other embodiments, e.g. STATCOM (typically with a delta or wye topology), Static Frequency AC-AC Converter (typically with a three phase to single phase or three phase to three phase MMC) applications.

The MMC 1 comprises a plurality of converter arms 3 (may alternatively be called legs, branches or chain-links), each comprising a plurality of series-connected (may alternatively be called chain-linked or cascaded) converter cells 4. In the HVDC/MVDC example of the figure, a double-star topology is used, where each phase 2 has an upper arm 3a connected to one of the DC terminals (here the positive DC terminal DC+) and a lower arm 3b connected to the other of the DC terminals (here the negative terminal DC−). Each of the respective phases 2 is connected to, or configured to be connected to, a respective phase of an AC grid at the respective AC terminals a, b and c of the MMC. It should be noted that the BB cells 4 of the present invention may be used in any MMC topology, in addition to the double-star (also called double-wye, -Y) topology exemplified in the figure, e.g. a delta (Δ) topology, a wye (Y) topology, or a combination thereof.

When the MMC 1 has a DC side, e.g. for HVDC or MVDC applications, as in FIG. 1, the DC terminals DC+ and DC− may be connected to an energy storage system, e.g. comprising or consisting of one or several batteries or supercapacitors, or a combination thereof.

A control arrangement 10 of the MMC 1 can comprise central controllers as well as distributed controllers for controlling the operation of the MMC.

FIG. 2 illustrates an embodiment of the BB cell 4. The cell comprises a primary energy storage $C_m$, e.g. comprising a capacitor arrangement comprising at least one capacitor or supercapacitor or a battery arrangement comprising at least one battery. The primary energy storage is herein exemplified as a main capacitor $C_m$. The cell also comprises a secondary energy storage $C_f$, e.g. comprising a capacitor arrangement comprising at least one capacitor or supercapacitor or a battery arrangement comprising at least one battery. The secondary energy storage is herein exemplified as a filter capacitor $C_f$. The cell also comprises an inductor $L_f$, e.g. a reactor, herein also called a filter inductor $L_f$.

The primary energy storage $C_m$, the secondary energy storage Cf and the inductor $L_f$ are all connected in parallel with each other, i.e. each is connected across each of the other two. Thus, two current paths for current circulation is formed within the cell 4, a front-end current path via the secondary energy storage $C_f$, the inductor $L_f$ and a first conductor valve T1, and a back-end current path via the primary energy storage $C_m$, the inductor $L_f$ and a second converter valve T2. Each converter valve T comprises a one-directional semiconductor switch S, e.g. comprising a Si or SiC (where SiC may be preferred for the relatively high switching frequencies of embodiments of the present invention) Insulated-Gate Bipolar Transistor (IGBT), Integrated Gate-Commutated Thyristor (IGCT), Metal-Oxide-Semiconductor Field-Effect Transistor (MOSFET), or Bi-Mode Insulated Gate Transistor (BiGT) depending on the application for which the MMC 1 is used, and an antiparallel diode D (connected across the switch but antiparallel by having the opposite polarity, i.e. by being able to conduct in the opposite direction). Thus, the first valve T1 comprises a first switch Si and a first antiparallel diode D1, and the second valve T2 comprises a second switch S2 and a second antiparallel diode D2. In the embodiment of FIG. 2, the first and second converter valves T1 and T2 are connected in series with each other, with the first and second switches S1 and S2 having the same polarity, i.e. able to conduct electric current in the same direction of the series connection when switched to electrically conducting (also called ON or closed switch).

In the cell 4, a cell voltage Uo is formed between its two terminals, and a DC voltage Udc is formed across the primary energy storage $C_m$. The currents io, iL and idc schematically given in the figure have been given a symbolic direction. However, it is noted that when a current flow is discussed herein, it is the current flow in its positive direction which is intended.

The cell 4 is configured such that, when power is flowing into the cell, the primary energy storage $C_m$ is charged in two steps. First, while the first semiconductor switch S1 is switched to conducting and the second semiconductor switch S2 is switched to non-conducting (also called OFF or open switch), a current flows or is allowed to flow from the positive side of the secondary energy storage $C_f$ to the inductor $L_f$, charging the inductor, via the first semiconductor switch S1, e.g. a current circulates clockwise in the front-end path of FIG. 2. Then, while both the first semiconductor switch S1 and the second semiconductor switch S2 are switched to non-conducting, a current flows or is allowed to flow from the charged inductor $L_f$ to the positive side of the primary energy storage $C_m$, charging the primary energy storage, via the second antiparallel diode D2, e.g. a current circulates counter clockwise in the back-end current path in FIG. 2.

Similarly, the cell 4 is configured such that, when power is flowing out of the cell, the primary energy storage $C_m$ is discharged in two steps. First, while the first semiconductor switch S1 is switched to non-conducting and the second semiconductor switch S2 is switched to conducting, a current is flowing or allowed to flow from the positive side of the primary energy storage $C_m$ to the inductor $L_f$, charging the inductor, via the second semiconductor switch S2, e.g. a current circulates clockwise in the back-end current path in FIG. 2. Then, while the first semiconductor switch S1 and the second semiconductor switch S2 are switched to non-conducting, a current flows or is allowed to flow from the charged inductor $L_f$ to the positive side of the secondary energy storage $C_f$, charging the secondary energy storage, via the first antiparallel diode D1, e.g. a current circulates counter clockwise in the front-end current path in FIG. 2.

The proposed cell structure can be regarded as a current source behind a capacitor $C_f$, behaving as a voltage-source cell. Hence, the arm reactor 5 can be omitted, or its rating can be reduced since there is a reactor $L_f$ within each cell 4 (modular reactor concept) controlling the current at the cell level. If using the BB MMC 1 as a STATCOM without a DC line, the phase reactors 5 are not needed. However, if a DC link is used (e.g. for HVDC or MVDC applications), a certain arm reactor value may still be useful to limit the surge current if a line-to-line short-circuit occurs on the DC link. A positive aspect of using a BB cell 4 may be that the needed inductor rating may be distributed and the fault case with shorted phase reactor can be relaxed.

The BB cell 4 may be particularly useful for high-voltage or medium voltage applications.

In embodiments of the BB cell 4, the total size of the energy storages $C_m + C_f$ may be smaller than the single energy storage of a conventional HB or FB cell, reducing the footprint of the converter 1.

In any MMC (chain-link converter) 1, the net DC energy of the cell energy storage exchanged per fundamental cycle with the grid may be zero. A switching average model can be developed to understand the switch S ratings of the proposed cell structure. The cell output voltage (Uo) and current (io) are known quantities from which the primary energy storage voltage (Udc) and current (Idc) waveforms can be determined as follows:

$$I_{dc}(T) = \frac{U_{ac}(t)I_{ac}(t)}{U_{dc}(t)} \quad (2)$$

$$U_{dc}(t) = \frac{1}{C}\int I_{dc}(t)dt \quad (3)$$

The switching cycle average value of the switch currents can be defined as:

$$I_{S2}(t) = I_{dc}(t) \quad (4)$$

$$I_{S1}(t) = I_o(t) \quad (5)$$

Hence, the first switch S1 is rated to the peak of cell output current io i.e., arm current and the second switch S2 is rated to the peak of the DC current idc. The first and second switches S1 and S2 each must be able to block the peak of sum of Uo and Udc. Assuming the peak of Uo being the same as Udc, each of the first and second switches must be able to block twice the nominal cell DC voltage Udc.

For power flow into the cell (i.e., from the secondary energy storage $C_f$ to the primary energy storage $C_m$), the first switch S1 is switched to conducting and the second switch S2 is kept OFF. When the first switch S1 is turned ON, the inductor $L_f$ is charged by the secondary energy storage $C_f$ and when it is turned OFF, the energy stored in the inductor is transferred to the primary energy storage $C_m$ via the second diode D2. At steady-state operation of the converter 1, the equation governing the duty cycle of the first switch S1 and the inductor current iL can be defined as:

$$\frac{U_{dc}}{U_{ac}} = \frac{D_1}{1-D_1} \quad (6)$$

$$I_L = \frac{I_{ac}}{D_1} = \frac{I_{dc}}{1-D_1} \quad (7)$$

Similarly, for power flow out of the cell (i.e., from the primary energy storage $C_m$ to the secondary energy storage $C_f$), the second switch S2 is switched to conducting and the first switch S1 is kept OFF. When the second switch S2 is turned ON, the inductor $L_f$ is charged by the primary energy storage and when it is turned OFF, the energy stored in the inductor $L_f$ is transferred to the secondary energy storage $C_f$ via the first diode D1. At steady-state operation of the converter 1, the equation governing the duty cycle of the second switch S2 and the inductor current iL can be defined as:

$$\frac{U_{ac}}{U_{dc}} = \frac{D_2}{1-D_2} \quad (8)$$

$$I_L = \frac{I_{dc}}{D_2} = \frac{I_{ac}}{1-D_2} \quad (9)$$

It can be noted that the direction of the inductor current iL is reversed for reversing the power flow. The voltage and current waveforms of the primary energy storage (in the form of a cell capacitor) $C_m$ and the output for the switching average model were simulated in MATLAB for the rated capacitive, inductive and Unity Power Factor (UPF) operation of MMC. It was seen that the semiconductor rating of the BB cell 4 was twice as that of a conventional HB cell.

Figure 3A:
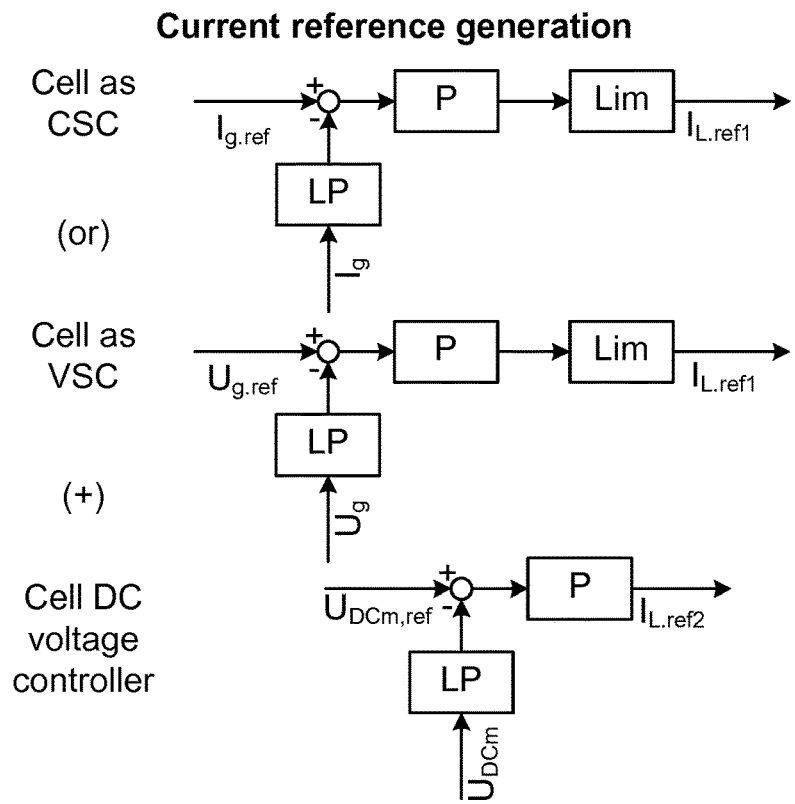
FIG. 3a is a schematic functional block diagram of current reference generation performed by the control arrangement of the MMC, in accordance with embodiments of the present disclosure.
Figure 3B:
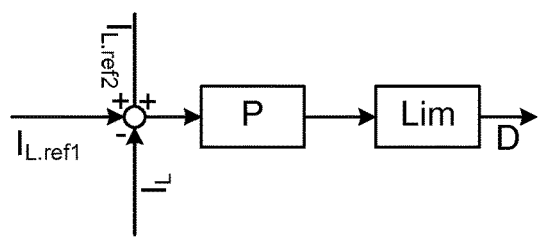
FIG. 3b is a schematic functional block diagram of a current controller of the control arrangement of the MMC, based on the current reference of FIG. 3a, in accordance with embodiments of the present disclosure.
Figure 3C:
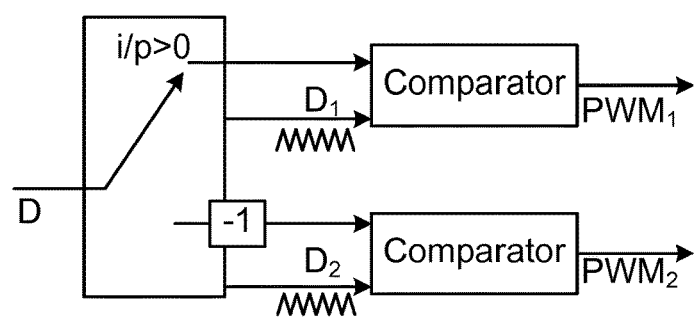
FIG. 3c is a schematic functional block diagram of PWM generation performed by the control arrangement of the MMC, based on the output of the current controller of FIG. 3b, in accordance with embodiments of the present disclosure.

The control arrangement 10 may comprise a respective cell-level controller for each BB cell 4, with reference to FIGS. 3a, 3b and 3c. The cell 4 may be operated in two different modes:

1. Voltage-source mode, where the cell acts as a Voltage Source Converter (VSC), i.e., controlling the cell output voltage Uo (across the secondary energy storage $C_f$) to the predetermined voltage reference from the current controller of each converter arm 3.
2. Current-source mode, where the cell acts as a Current Source Converter (CSC), i.e., controlling the output current io injected by the cell 4 into its converter arm 3.

The magnitude and the direction of the inductor $L_f$ current iL may be controlled by using a current controller to control the power flow between the primary and secondary energy storages $C_m$ and $C_f$. The inductor-current reference may be generated from outer control loop(s) i.e., from the voltage or current reference from the converter arm-current controller, depending on if the cell 4 must behave as a voltage or current source, respectively. Additionally, an energy storage (e.g. cell-capacitor) voltage controller may be included in the outer control loop(s) to ensure the primary energy storage maintains its nominal DC voltage idc value. A proportional (P) controller may be used for the sake of simplicity, but Proportional-Integral (PI) or Proportional-Integral-Derivative (PID) controllers, optionally with feed-forward terms could alternatively or additionally be used to improve transient performance. The cell-level current controller may generate the duty ratio that is needed to control the inductor current iL. A carrier comparison based Pulse-Width Modulation (PWM) is used to modulate the first and second switches S1 and S2 of the cell 4. An advanced modulation method may be used to modulate the first and second switches S1 and S2 of the cell 4 to gain specific objectives such as loss reduction or harmonic reduction.

In some embodiments of the present invention, each of the first and second semiconductor switches S1 and S2 is configured for a switching frequency of at least 1 kHz, e.g. at least 5 or 10 kHz.

In some embodiments of the present invention, each of the first and second semiconductor switches S1 and S2 comprises a silicon carbide or silicon semiconductor material, or a combination thereof, preferably silicon carbide.

In some embodiments of the present invention, each of the first and second semiconductor switches S1 and S2 comprises an IGBT, an IGCT, a BiGT, or a MOSFET.

In some embodiments of the present invention, the MMC has a wye, double-wye, triple-wye or delta topology, or a combination thereof, e.g. a double-wye topology as in FIG. 1.

In some embodiments of the present invention, the MMC is configured to operate as a STATCOM, as an HVDC or MVDC converter, or as a railway intertie, e.g. an AC to DC converter, such as for HVDC or MVDC applications, as in FIG. 1.

In some embodiments of the present invention, the MMC 1 has a DC side comprising a positive DC terminal DC+ and a negative DC terminal DC−. In some embodiments the positive and negative DC terminals are connected to an energy storage system, e.g. comprising or consisting of one or several batteries or supercapacitors, or a combination thereof.

According to a more general, structural, aspect of the present invention, there is provided a converter cell 4 for an MMC 1. The cell comprises a primary energy storage $C_m$, an inductor $L_f$, and a secondary energy storage $C_f$ as well as first and second converter valves T1 and T2. The secondary energy storage $C_f$ is connected in series with the first converter valve T1, and together with said first converter valve in parallel with the inductor $L_f$, and the primary energy storage $C_m$ is connected in series with the second converter valve T2, and together with said second converter valve T2 in parallel with the inductor $L_f$.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A converter cell for a modular multilevel converter, the cell consisting of:
    a primary energy storage;
    an inductor;
    a secondary energy storage, the primary energy storage, the inductor and the secondary energy storage all connected in parallel with each other between two terminals of the cell;
    a first converter valve comprising a first semiconductor switch and a first antiparallel diode, wherein the secondary energy storage is connected in series with the first converter valve, and together with the first converter valve in parallel with the inductor; and
    a second converter valve comprising a second semiconductor switch and a second antiparallel diode, the second semiconductor switch able to conduct electrical current in the same direction as the first semiconductor switch when switched to a conducting state, wherein the primary energy storage is connected in series with the second converter valve, and together with the second converter valve in parallel with the inductor;
    wherein the cell is configured such that, when power is flowing into the cell:
        when the first semiconductor switch is switched to conducting and the second semiconductor switch is switched to non-conducting, a current is allowed to flow from the secondary energy storage to the inductor, charging the inductor, via the first semiconductor switch, after which;
        when both the first semiconductor switch and the second semiconductor switch are switched to non-conducting, a current is allowed to flow from the charged inductor to the primary energy storage, charging the primary energy storage, via the second antiparallel diode; and
    wherein the cell is configured such that, when power is flowing out of the cell:
        when the first semiconductor switch is switched to non-conducting and the second semiconductor switch is switched to conducting, a current is allowed to flow from the primary energy storage to the inductor, charging the inductor, via the second semiconductor switch, after which;
        when both the first semiconductor switch and the second semiconductor switch are switched to non-conducting, a current is allowed to flow from the charged inductor to the secondary energy storage, charging the secondary energy storage, via the first antiparallel diode.

2. The cell of claim 1, wherein each of the first and second semiconductor switches is configured for a switching frequency of at least 1 kHz.

3. The cell of claim 2, wherein each of the first and second semiconductor switches is configured for a switching frequency of at least $_5$ kHz.

4. The cell of claim 3, wherein each of the first and second semiconductor switches is configured for a switching frequency of at least 10 kHz.

5. The cell of claim 1, wherein each of the first and second semiconductor switches comprises a silicon carbide semiconductor material.

6. The cell of claim 1, wherein each of the first and second semiconductor switches comprises a silicon carbide or silicon semiconductor material or a combination of silicon carbide and silicon,.

7. The cell of claim 1, wherein each of the first and second semiconductor switches comprises an Insulated-Gate Bipolar Transistor, an Integrated Gate-Commutated Thyristor, a Bi-Mode Insulated Gate Transistor, or a Metal-Oxide-Semiconductor Field-Effect Transistor.

8. A Modular Multilevel Converter (MMC) comprising a plurality of converter arms, each arm comprising a plurality of series-connected converter cells of claim 1.

9. The MMC of claim 8, wherein the MMC has a wye, double-wye, triple-wye or delta topology, or a combination thereof.

10. The MMC of claim 8, wherein the MMC is configured to operate as a STATCOM, as an HVDC or MVDC converter, or as a railway intertie.

11. The MMC of claim 8, wherein the MMC has a DC side comprising a positive DC terminal and a negative DC terminal.

12. The MMC of claim 11, wherein the positive and negative DC terminals are connected to an energy storage system.

13. The MMC of claim 12, wherein the energy storage system comprises a battery.

14. The MMC of claim 12, wherein the energy storage system comprises a supercapacitor.

15. The MMC of claim 12, wherein the energy storage system comprises a battery and a supercapacitor.

16. A method performed by a control arrangement for controlling a converter cell in a Modular Multilevel Converter (MMC),
    wherein the converter cell comprises:
        a primary energy storage;
        an inductor;
        a secondary energy storage, the primary energy storage, the inductor and the secondary energy storage all connected in parallel with each other between two terminals of the cell;
        a first converter valve comprising a first semiconductor switch and a first antiparallel diode, wherein the secondary energy storage is connected in series with the first converter valve, and together with the first converter valve in parallel with the inductor; and a second converter valve comprising a second semiconductor switch and a second antiparallel diode, the second semiconductor switch able to conduct electrical current in the same direction as the first semiconductor switch when switched to a conducting state, wherein the primary energy storage is connected in series with the second converter valve, and together with the second converter valve in parallel with the inductor; and wherein the method comprises:

when power is flowing into the cell:
  switching the first semiconductor switch to conducting while the second semiconductor switch is switched to non-conducting, allowing a current to flow within the cell from the secondary energy storage to the inductor, charging the inductor, via the first semiconductor switch, and
  switching the first semiconductor switch to non-conducting while the second semiconductor switch remains switched to non-conducting, allowing a current to flow within the cell from the charged inductor to the primary energy storage, charging the primary energy storage, via the second antiparallel diode which is antiparallel to the second semiconductor switch; and when power is flowing out of the cell:
  switching the second semiconductor switch to conducting while the first semiconductor switch is switched to non-conducting, allowing a current to flow within the cell from the primary energy storage to the inductor, charging the inductor, via the second semiconductor switch; and
  switching the second semiconductor switch to non-conducting while the first semiconductor switch remains switched to non-conducting, allowing a current to flow within the cell from the charged inductor to the secondary energy storage, charging the secondary energy storage, via the first antiparallel diode which is antiparallel to the first semiconductor switch.

17. A converter cell for a modular multilevel converter, the cell comprising:
  a primary energy storage having a first terminal and a second terminal;
  an inductor having a first terminal and a second terminal, the second terminal of the inductor connected to the second terminal of the primary energy storage;
  a secondary energy storage having a first terminal and a second terminal, the second terminal of the secondary energy storage connected to the second terminal of the primary energy storage;
  a first converter valve comprising a first semiconductor switch and a first antiparallel diode, the first converter valve having a first terminal connected to the first terminal of the primary energy storage and a second terminal connected to the first terminal of the inductor; and
  a second converter valve comprising a second semiconductor switch and a second antiparallel diode, the second converter valve having a first terminal connected to the inductor and a second terminal connected to the first terminal of the secondary energy storage;

wherein the second semiconductor switch able to conduct electrical current in the same direction as the first semiconductor switch when switched to a conducting state;

wherein the cell has a first cell terminal connected to the first terminal of the secondary energy storage and a second cell terminal connected to the second terminals of the primary energy storage, the inductor, and secondary energy storage; and wherein the cell is configured such that, when power is flowing into the cell via the first and second cell terminals:
  when the first semiconductor switch is switched to conducting and the second semiconductor switch is switched to non-conducting, a current is allowed to flow from the secondary energy storage to the inductor, charging the inductor, via the first semiconductor switch, after which;
  when both the first semiconductor switch and the second semiconductor switch are switched to non-conducting, a current is allowed to flow from the charged inductor to the primary energy storage, charging the primary energy storage, via the second antiparallel diode; and wherein the cell is configured such that, when power is flowing out of the cell via the first and second cell terminals:
  when the first semiconductor switch is switched to non-conducting and the second semiconductor switch is switched to conducting, a current is allowed to flow from the primary energy storage to the inductor, charging the inductor, via the second semiconductor switch, after which;
  when both the first semiconductor switch and the second semiconductor switch are switched to non-conducting, a current is allowed to flow from the charged inductor to the secondary energy storage, charging the secondary energy storage, via the first antiparallel diode.

18. The cell of claim 17, wherein each of the first and second semiconductor switches comprises a silicon carbide or silicon semiconductor material or a combination of silicon carbide and silicon.

19. The cell of claim 17, wherein each of the first and second semiconductor switches comprises an Insulated-Gate Bipolar Transistor, an Integrated Gate-Commutated Thyristor, a Bi-Mode Insulated Gate Transistor, or a Metal-Oxide-Semiconductor Field-Effect Transistor.

* * * * *

UNITED STATES PATENT AND TRADEMARK OFFICE
CERTIFICATE OF CORRECTION

| | |
|---|---|
| PATENT NO. | : 11,424,679 B2 |
| APPLICATION NO. | : 17/429852 |
| DATED | : August 23, 2022 |
| INVENTOR(S) | : Aravind Mohanaveeramani |

It is certified that error appears in the above-identified patent and that said Letters Patent is hereby corrected as shown below:

In the Claims

Claim 3, Column 10, Line 16; delete "$_5$ kHz" and insert --5 kHz--.

Signed and Sealed this
Fourth Day of October, 2022

Katherine Kelly Vidal
*Director of the United States Patent and Trademark Office*